US011234010B2

(12) United States Patent
Hu et al.

(10) Patent No.: US 11,234,010 B2
(45) Date of Patent: Jan. 25, 2022

(54) CROSS-COMPONENT ADAPTIVE LOOP FILTERING FOR VIDEO CODING

(71) Applicant: QUALCOMM Incorporated, San Diego, CA (US)

(72) Inventors: Nan Hu, San Diego, CA (US); Jie Dong, Sunnyvale, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/004,831

(22) Filed: Aug. 27, 2020

(65) Prior Publication Data

US 2021/0067793 A1    Mar. 4, 2021

Related U.S. Application Data

(60) Provisional application No. 62/892,908, filed on Aug. 28, 2019.

(51) Int. Cl.
*H04N 19/44* (2014.01)
*H04N 19/146* (2014.01)
*H04N 19/117* (2014.01)
*H04N 19/46* (2014.01)
*H04N 19/186* (2014.01)
(Continued)

(52) U.S. Cl.
CPC ........... *H04N 19/44* (2014.11); *H04N 19/117* (2014.11); *H04N 19/146* (2014.11); *H04N 19/176* (2014.11); *H04N 19/184* (2014.11); *H04N 19/186* (2014.11); *H04N 19/46* (2014.11)

(58) Field of Classification Search
None
See application file for complete search history.

(56) References Cited

U.S. PATENT DOCUMENTS

| 2014/0092999 A1 | 4/2014 | Dong et al. |
| 2017/0237982 A1 | 8/2017 | Karczewicz et al. |
| 2020/0260120 A1* | 8/2020 | Hanhart ................. H04N 19/82 |

FOREIGN PATENT DOCUMENTS

| WO | WO-2020259538 A1 * | 12/2020 | ........... H04N 19/186 |
| WO | WO-2020262396 A1 * | 12/2020 | ............. H04N 19/82 |

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010, pp. 1-6.

(Continued)

*Primary Examiner* — Frederick D Bailey
(74) *Attorney, Agent, or Firm* — Shumaker & Sieffert, P.A.

(57) ABSTRACT

An example device for decoding video data includes a memory configured to store video data; and one or more processors implemented in circuitry and configured to: determine a number of bits, k, used to represent a decimal value for a filter coefficient of a cross-component adaptive loop filter; determine that a dynamic range of the filter coefficient comprises $(-(1<<(k-c))+1, (1<<(k-c))-1)$ for a value of c, c representing an offset value to the value of k, and '<<' representing a bitwise left shift operator; decode a block of the video data; and performing cross-component adaptive loop filtering of the decoded block using the filter coefficient, the filter coefficient being within the dynamic range.

27 Claims, 8 Drawing Sheets

(51) Int. Cl.
  *H04N 19/184* (2014.01)
  *H04N 19/176* (2014.01)

(56) References Cited

OTHER PUBLICATIONS

Hu N., et al., "CE5-related: Multiplication Removal for Cross Component Adaptive Loop Filter", JVET-P0557, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-5.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

JVET: "VTM-6.0, Tags, JVET/VVCSoftware_VTM, GitLab", Frank Bossen, https://vcgit.hhi.fraunhofer.de/jvet/VVCSoftware_VTM/-/tags/VTM-6.0, Jul. 2019, pp. 1-4.

Hu N., "CE5-related: Dynamic range reduction for coefficients of cross component adaptive loop filter", Joint Video Experts Team (JVET) of ITU-T SG 16 WP 3 and ISO/IEC14 UTC 1/5C 29/WG 11, 16th Meeting: Geneva, CH, Oct. 1-11, 2019, JVET-P0555, pp. 1-7.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Misra K., et al., "CE5-2.1, CE5-2.2: Cross Component Adaptive Loop Filter", Joint Video Experts Team (JVET) of ITU-T SG 16 WP 3 and ISO/IEC14 UTC 1/5C 29/WG 11, 16th Meeting: Geneva, CH, Oct. 1-11, 2019, JVET-P0080, pp. 1-7.

Misra (SharpLabs) K., et al., "Cross-Component Adaptive Loop Filter for Chroma", 15th JVET Meeting, 20190703-20190712, Gothenburg, (The Joint Video Exploration Team of ISO/IEC JTC1/SC29/WG11 and ITU-T SG.16), No. JVET-O0636_r1, Jul. 7, 2019 (Jul. 7, 2019), XP030220123, pp. 1-9, Retrieved from the Internet: URL:http://phenix.int-evry.fr/jvet/doc_end_user/documents/15_Gothenburg/wg11/JVEf-O0636-v2.zip, JVET-O0636_r1.docx.

Misra K., et al., "CE5-Related: Reducing multiplier count in CCALF", Joint Video Experts Team (JVET) of ITU-T SG 16 WP 3 and ISO/IEC14 UTC 1/5C 29/WG 11, 16th Meeting: Geneva, CH, Oct. 1-11, 2019, JVET-P0468, pp. 1-4.

International Search Report and Written Opinion—PCT/US2020/048485—ISA/EPO—dated Oct. 16, 2020.

Su Y-C., et al., "CE2-related: Reduction of Bits for ALF Coefficient Fractional Part", 12th JVET Meeting, Oct. 3-12, 2018, Macao, (The Joint Video Exploration Team of ISO/IEC JTC1/SC29/WG11 and ITU-T SG.16), No. JVET-L0083-V2, Oct. 4, 2018 (Oct. 4, 2018), XP030250903, pp. 1-9, Retrieved from the Internet: URL:http://phenix.int-evry.fr/jvet/doc_end_user/documents/12_Macao/wg11/JVET-L0083-v4.zip, JVET-L0083-v2-clean.docx [retrieved on Oct. 4, 2018].

\* cited by examiner

CROSS-COMPONENT ADAPTIVE LOOP FILTERING FOR VIDEO CODING

This application claims the benefit of U.S. Provisional Application No. 62/892,908, filed Aug. 28, 2019, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to cross-component adaptive loop filtering of video data. These techniques include, for example, coding (encoding or decoding) filter coefficients for cross-component adaptive loop filters (CCALFs) and coding data indicating which of a variety of CCALFs is to be applied to a given set of video data, e.g., for a slice, block, chroma component, or the like. In general, video coders apply CCALFs to a chroma component block, and use samples of a corresponding luma component to refine the samples of the chroma component block. In accordance with the techniques of this disclosure, a video coder may code data representing filter coefficients of each CCALF.

For example, the filter coefficients may each have rational values, including a decimal portion and a fractional portion. A video coder may determine a range for a value of a filter coefficient from a number of bits used to represent the decimal portion of the filter coefficient value. Thus, the video coder can determine the value of the filter coefficient using the range value. After determining values for each of the filter coefficients (using ranges determined for the values of the filter coefficients), the video coder may perform cross-component adaptive loop filtering of decoded blocks of video data using CCALFs having the determined filter coefficient values.

In one example, a method of decoding video data includes determining a number of bits, k, used to represent a decimal value for a filter coefficient of a cross-component adaptive loop filter; determining that a dynamic range of the filter coefficient comprises $(-(1<<(k-c))+1, (1<<(k-c))-1)$ for a value of c, c representing an offset value to the value of k, and '<<' representing a bitwise left shift operator; decoding a block of video data; and performing cross-component adaptive loop filtering of the decoded block using the filter coefficient, the filter coefficient being within the dynamic range.

In another example, a device for decoding video data includes a memory configured to store video data; and one or more processors implemented in circuitry and configured to: determine a number of bits, k, used to represent a decimal value for a filter coefficient of a cross-component adaptive loop filter; determine that a dynamic range of the filter coefficient comprises $(-(1<<(k-c))+1, (1<<(k-c))-1)$ for a value of c, c representing an offset value to the value of k, and '<<' representing a bitwise left shift operator; decode a block of the video data; and perform cross-component adaptive loop filtering of the decoded block using the filter coefficient, the filter coefficient being within the dynamic range.

In another example, a computer-readable storage medium has stored thereon instructions that, when executed, cause a processor to determine a number of bits, k, used to represent a decimal value for a filter coefficient of a cross-component adaptive loop filter; determine that a dynamic range of the filter coefficient comprises $(-(1<<(k-c))+1, (1<<(k-c))-1)$ for a value of c, c representing an offset value to the value of k, and '<<' representing a bitwise left shift operator; decode a block of video data; and perform cross-component adaptive loop filtering of the decoded block using the filter coefficient, the filter coefficient being within the dynamic range.

In another example, a device for decoding video data includes means for determining a number of bits, k, used to represent a decimal value for a filter coefficient of a cross-component adaptive loop filter; means for determining that a dynamic range of the filter coefficient comprises $(-(1<<(k-c))+1, (1<<(k-c))-1)$ for a value of c, c representing an offset value to the value of k, and '<<' representing a bitwise left shift operator; means for decoding a block of video data; and means for performing cross-component adaptive loop filtering of the decoded block using the filter coefficient, the filter coefficient being within the dynamic range.

The details of one or more examples are set forth in the accompanying drawings and the description below. Other features, objects, and advantages will be apparent from the description, drawings, and claims.

DETAILED DESCRIPTION

Cross-component adaptive loop filters (CCALFs) allow chrominance data to be filtered using corresponding luminance data. CCALFs may be incorporated into adaptive loop filters (ALFs) to refine chrominance components of video data. This disclosure describes various improvements to CCALF. For example, filter coefficients in CCALF are represented as fixed-point decimal numbers coded using ten bits. This disclosure describes fixed-length coding using fewer than ten bits to code the decimal portion of the filter coefficients. CCALF filter coefficients are also coded using a cost multiplier. This disclosure describes techniques for reducing the cost multiplier by constraining a dynamic range of the filter coefficients. By reducing the number of bits used to represent the decimal portion of the coefficients and the cost multiplier, a size of a bitstream can be reduced, thereby improving the technical field of video coding.

Figure 1:
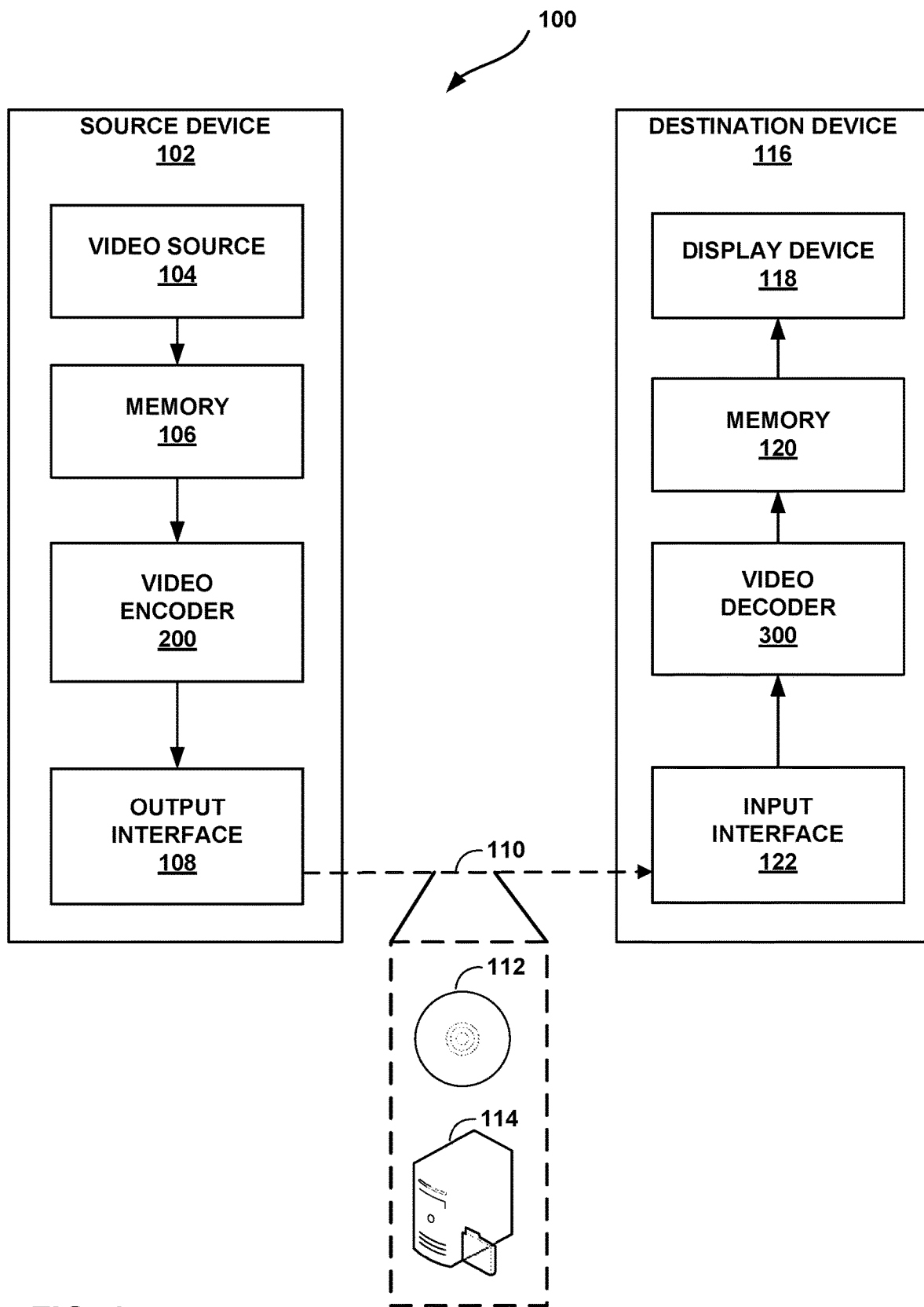
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing cross-component adaptive loop filtering. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for cross-component adaptive loop filtering. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder

300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14th Meeting: Geneva, CH, 19-27 Mar. 2019, JVET-N1001-v3 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks.

Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Video encoder 200 and video decoder 300 may further be configured to perform cross-component adaptive loop filtering. That is, after decoding a chrominance (chroma) block, video encoder 200 and video decoder 300 may refine samples of the decoded chroma block using cross-component adaptive loop filtering. In general, video encoder 200 and video decoder 300 may apply a cross-component adaptive loop filter (CCALF) to the decoded chroma block, where the CCALF refers to corresponding luma samples to be used to refine samples of the decoded chroma block.

The CCALF includes a set of filter coefficients. Video encoder 200 and video decoder 300 may code (encode or decode, respectively) values of the filter coefficients, e.g., in an adaptation parameter set (APS), a picture parameter set (PPS), a sequence parameter set (SPS), a slice header, a block header, or in other such structures. In accordance with the techniques of this disclosure, video encoder 200 and video decoder 300 may use a number of bits representing a decimal portion of a filter coefficient and an offset value to calculate a dynamic range in which the value of the filter coefficient will be. Thus, using the dynamic range, video encoder 200 and video decoder 300 may reduce a number of bits needed to code the actual filter coefficient value, if the dynamic range were not determined.

Let k represent the number of bits used to represent the decimal portion of a filter coefficient, and let c represent the offset value. Video encoder 200 and video decoder 300 may calculate the dynamic range as being $(-(1<<(k-c))+1, (1<<(k-c))-1)$, where '<<' represents a bitwise left shift operator. The offset value c may be predetermined or coded as part of a bitstream including the video data. The value of k may be less than 10 and greater than 0. Video encoder 200 and video decoder 300 may code the value of the filter coefficient using a fixed length codeword. As noted above, video encoder 200 and video decoder 300 may code filter coefficients of CCALFs in, e.g., an APS. Video encoder 200 and video decoder 300 may code an index value in a slice header or block identifying one of the CCALFs to be used for the slice/block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
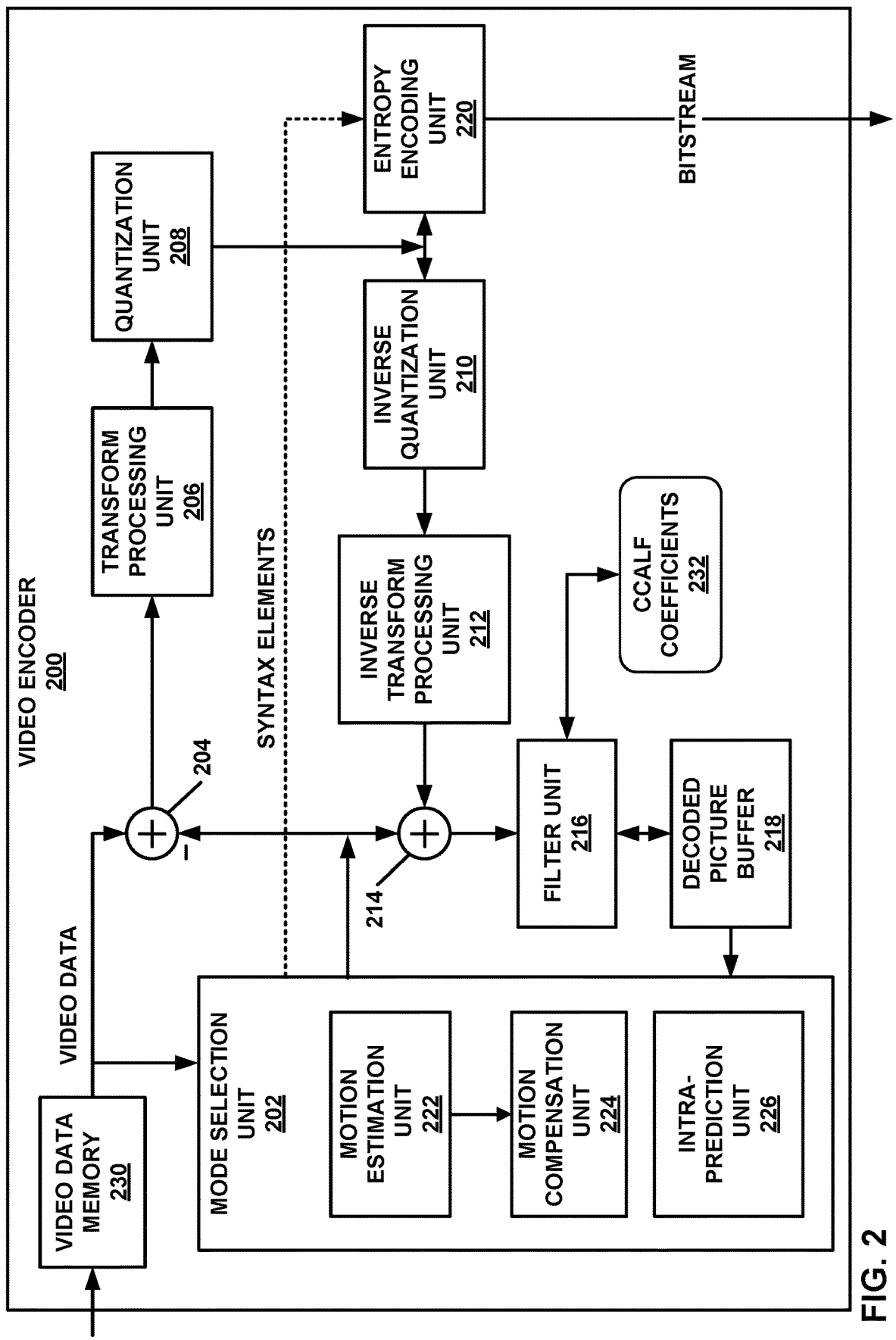
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generates syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. Filter unit 216 may perform cross-component adaptive loop filtering techniques of this disclosure, alone or in any combination. Likewise, entropy encoding unit 220 may be configured to entropy encode cross-component adaptive loop filtering parameters according to the techniques of this disclosure.

In accordance with the techniques of this disclosure, filter unit 216 retrieves cross-component adaptive loop filter (CCALF) filter coefficients from CCALF coefficients memory 232. CCALF coefficients memory 232 may form part of video data memory 230 in other examples. In general, CCALF coefficients memory 232 stores CCALF filter coefficients for one or more CCALFs. Mode selection unit 202 may perform multiple coding passes to determine an appropriate one of the CCALFs to be used for chroma blocks of a current slice, and then send data representing the one of the CCALFs to entropy encoding unit 220. Entropy encoding unit 220 may entropy encode an adaptation parameter set (APS) including sets of CCALF filter coefficients for one or more CCALFs for a chroma component, and a slice header including an index identifying one of the CCALFs to be used for the chroma component in the slice.

Moreover, to encode data representing CCALF filter coefficients, entropy encoding unit 220 may encode data representing a number of bits used to represent a decimal portion of a CCALF filter coefficient. For example, k can represent the number of bits used to represent the decimal portion of the CCALF filter coefficient. Moreover, c can represent an offset to be applied to k. In some examples, c may be predetermined, while in other examples, entropy encoding unit 220 may encode data representing c, e.g., in a sequence parameter set (SPS), a picture parameter set (SPS), an adaptation parameter set (APS), a slice header, a block header, or at a filter level (e.g., a value of c specific to the corresponding CCALF, such as in the APS).

Filter unit 216 may determine a dynamic range for a CCALF filter coefficient using the values of c and k. The dynamic range may be within $(-(1<<(k-c))+1, (1<<(k-c))-1)$, where '<<' represents a bitwise left shift operator. Filter unit 216 may use the dynamic range to determine an appropriate value to represent the CCALF filter coefficient, such as an appropriate fixed length codeword. Filter unit 216 may pass the fixed length codeword to entropy encoding unit 220. Alternatively, entropy encoding unit 220 may determine the values of k, c, and the dynamic range, and use these values to select the appropriate fixed length codeword.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Filter unit 216 may apply the CCALF to a decoded chrominance block, and store the filtered chrominance block to decoded picture buffer 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture. In another example, reconstructed samples without running filters in filter unit 216 may be stored in DPB and used for intra-prediction.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a number of bits, k, used to represent a decimal value for a filter coefficient of a cross-component adaptive loop filter; determine that a dynamic range of the filter coefficient comprises $(-(1<<(k-c))+1, (1<<(k-c))-1)$ for a value of c, c representing an offset value to the value of k, and '<<' representing a bitwise left shift operator; decode a block of the video data; and perform cross-component adaptive loop filtering of the decoded block using the filter coefficient, the filter coefficient being within the dynamic range.

Figure 3:
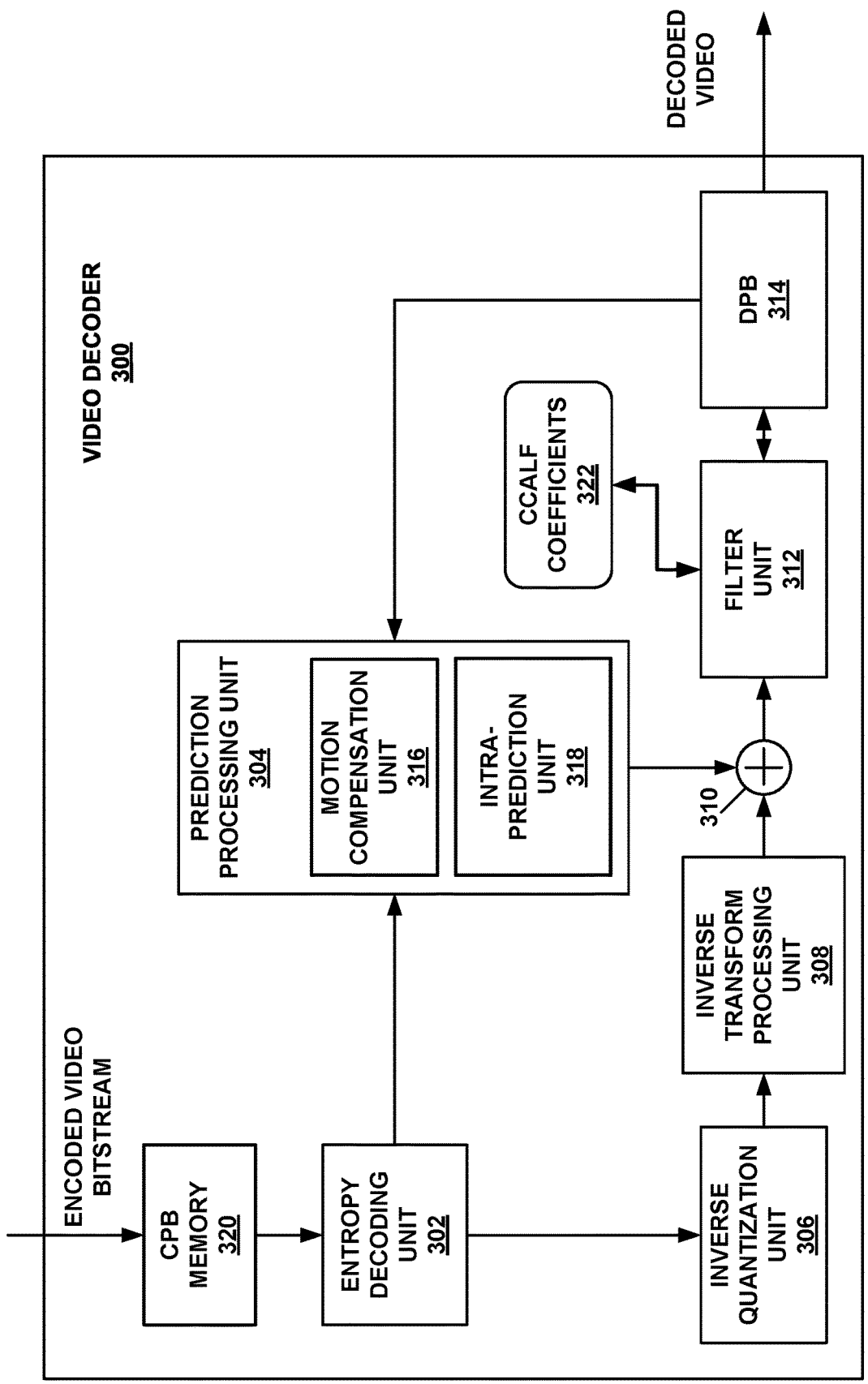
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314. In one example, unfiltered reconstructed samples without running filter unit 312 may be stored in DPB 314 and used for intra-prediction.

Reconstruction unit 310 may reconstruct the current block using the prediction block and the residual block. For example, reconstruction unit 310 may add samples of the residual block to corresponding samples of the prediction block to reconstruct the current block.

Entropy decoding unit 302 may further entropy decode cross-component adaptive loop filter (CCALF) parameters according to the techniques of this disclosure. Entropy decoding unit 302 may provide the cross-component adaptive loop filter parameters to filter unit 312. Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. According to the techniques of this disclosure, filter unit 312 may use the cross-component adaptive loop filter parameters to perform cross-component adaptive loop filtering on chroma components of a decoded block of video data.

In accordance with the techniques of this disclosure, entropy decoding unit 302 may entropy decode an adaptation parameter set (APS) including data for one or more cross-component adaptive loop filter (CCALF) filter coefficients, e.g., one or more sets of CCALF filter coefficients. Entropy decoding unit 302 may also entropy decode a slice header of a slice including a current block, and the slice header may include one or more indexes referring to one or more of the sets of CCALF filter coefficients that may be used to perform CCALF filtering of chroma block samples of the slice. Alternatively, the indexes may be included in a block header (e.g., a chroma block header, a CU header, a CTU header, or other such data structures).

Entropy decoding unit 302 may store CCALF filter coefficients to CCALF coefficients memory 322. CCALF coefficients memory 322 may form part of the same memory including CPB memory 320 in some examples. In general, CCALF coefficients memory 322 stores CCALF filter coefficients for one or more CCALFs.

To decode data representing CCALF filter coefficients, entropy decoding unit 302 may decode data representing a number of bits used to represent a decimal portion of a CCALF filter coefficient. For example, k can represent the number of bits used to represent the decimal portion of the CCALF filter coefficient. Moreover, c can represent an offset to be applied to k. In some examples, c may be predetermined, while in other examples, entropy decoding unit 302 may decode data representing c, e.g., in a sequence parameter set (SPS), a picture parameter set (SPS), an adaptation parameter set (APS), a slice header, a block header, or at a filter level (e.g., a value of c specific to the corresponding CCALF, such as in the APS). The value of k may be less than 10 and greater than 0.

Entropy decoding unit 302 and/or filter unit 312 may determine a dynamic range for a CCALF filter coefficient using the values of c and k. The dynamic range may be within $(-(1<<(k-c))+1, (1<<(k-c))-1)$, where '<<' represents a bitwise left shift operator. Entropy decoding unit 302 may entropy decode (or use bypass mode decoding to decode) a fixed length codeword representing the CCALF filter coefficient. Filter unit 312 and/or entropy decoding unit 302 may use the dynamic range to determine the value of the CCALF filter coefficient such that the value of the CCALF filter coefficient is within the dynamic range. For example, entropy decoding unit 302 and/or filter unit 312 may determine that a decoded value represents an offset to be added to the lower end of the range to reconstruct the actual value of the CCALF filter coefficient. Entropy decoding unit 302 may pass either the decoded value or the CCALF filter coefficient to filter unit 312, which may store the CCALF filter coefficient to CCALF coefficients memory 322.

Furthermore, entropy decoding unit 302 may pass the values of the one or more indexes to filter unit 312, and filter unit 312 may use the indexes to determine appropriate sets of CCALF filter coefficients to apply to decoded chroma blocks of video data. Filter unit 312 may retrieve samples of corresponding luma blocks to the chroma blocks and apply the CCALF filter coefficients to modify the chroma block samples using the corresponding luma block samples.

Video decoder 300 may store the reconstructed and filtered blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a number of bits, k, used to represent a decimal value for a filter coefficient of a cross-component adaptive loop filter; determine that a dynamic range of the filter coefficient comprises $(-(1<<(k-c))+1, (1<<(k-c))-1)$ for a value of c, c representing an offset value to the value of k, and '<<' representing a bitwise left shift operator; decode a block of the video data; and perform cross-component adaptive loop filtering of the decoded block using the filter coefficient, the filter coefficient being within the dynamic range.

Figure 4:
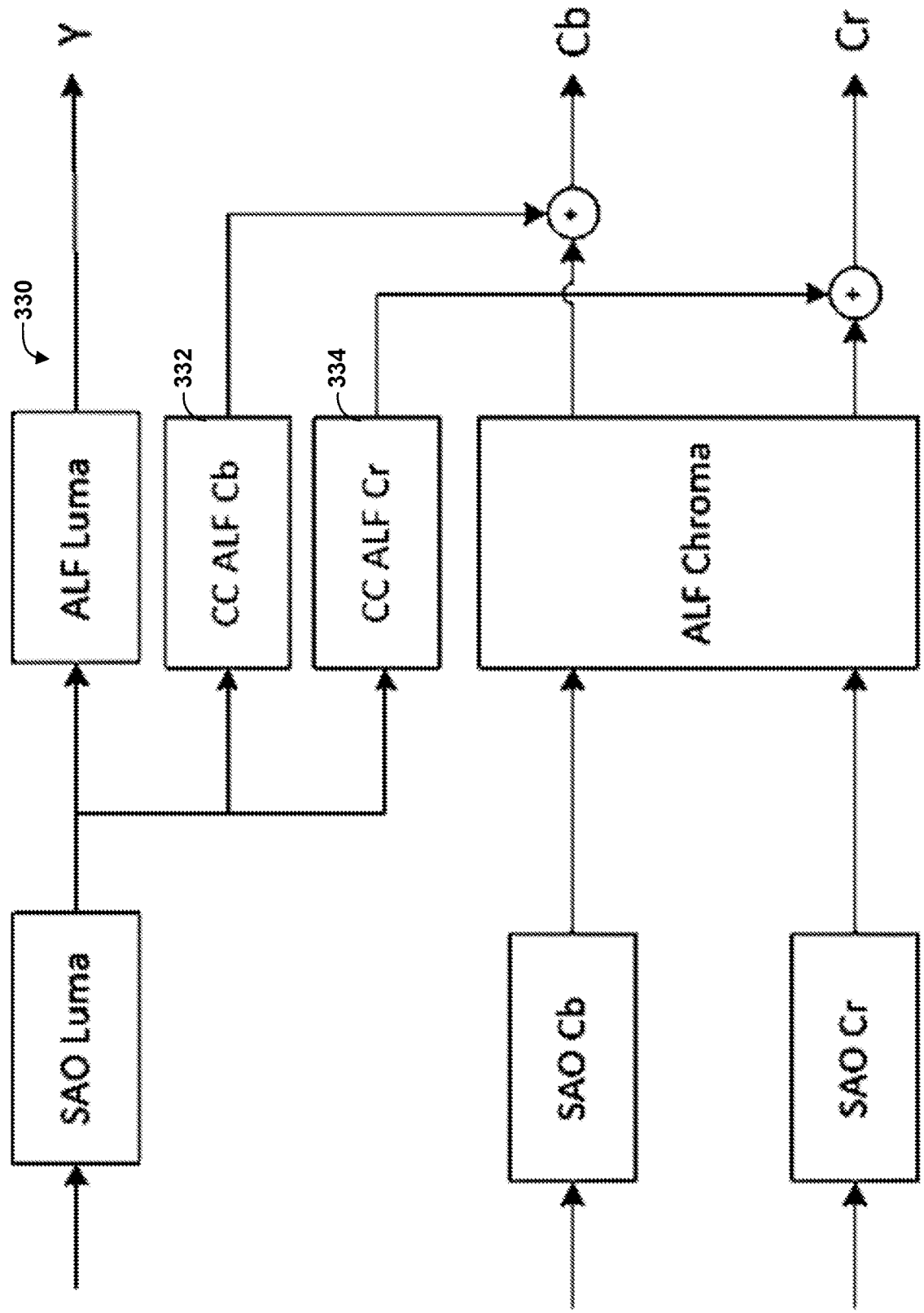
FIG. 4 is a block diagram illustrating example adaptive loop filters including cross-component adaptive loop filters, which can be used in accordance with the techniques of this disclosure.

FIG. 4 is a block diagram illustrating an example set of adaptive loop filters 330 including cross-component adaptive loop filters 332, 334, which can be used in accordance with the techniques of this disclosure. In particular, cross-component adaptive loop filter 332 is for blue hue chrominance data, while cross-component adaptive loop filter 334 is for red-hue chrominance data. Filter unit 216 of FIG. 2 and/or filter unit 312 of FIG. 3 may include a set of adaptive loop filters (ALFs) similar or identical to adaptive loop filters 330 of FIG. 4.

In JVET-O0636, a tool called cross-component adaptive loop filter (CCALF) was proposed. CCALF operates as part of an adaptive loop filter (ALF) and makes use of luma samples to refine each chroma component. The tool is controlled by information in the bitstream, and this information includes filter coefficients for each chroma component (signaled in an adaptation parameter set (APS)) and a mask controlling the application of the filter for blocks of samples. In JVET-O0636, each filter coefficient is represented as a fixed-point decimal number. In particular, a filter coefficient uses the lower 10 bits to represent the decimal part. Each coefficient is signaled with exponential-Golomb (EG) coding, whose order depends on the coefficient position in the filter template.

This disclosure recognizes that the CCALF tool described in JVET-O0636 can be improved and simplified, e.g., according to any or all of the techniques of this disclosure. Accordingly, cross-component adaptive loop filters 332, 334 of FIG. 4 may be configured according to any or all of the techniques of this disclosure, e.g., as described below, in any combination.

According to this disclosure, coefficient codes can be simplified relative to the techniques of JVET-O0636. In some examples, fixed-length coding may be used to signal a filter coefficient for cross-component adaptive loop filters 332, 334. In some examples, all coefficients may be coded as exponential-golomb (EG) with the same order value, where the order value may be fixed. Alternatively, the order value may be signaled at a sequence or APS level, and all filter coefficients of cross-component adaptive loop filters 332, 334 may be signaled using the same order value.

Alternatively, the order value may be signaled at the filter level, and all coefficients of one of cross-component adaptive loop filters 332, 334 may be coded using the respective order value. In this manner, video encoder 200 may encode and video decoder 300 may decode the filter coefficients for cross-component adaptive loop filters 332, 334 using a j-th order exponential Golomb codeword, and the value for j may be coded in an SPS, APS, PPS, slice header, block header, or the like. Alternatively, video encoder 200 and video decoder 300 may be preconfigured with a value of j, or use fixed-length coding to code filter coefficients for cross-component adaptive loop filters 332, 334.

In some examples, video encoder 200 and video decoder 300 may code decimal parts of filter coefficients for cross-component adaptive loop filters 332, 334 using fewer than 10 bits.

In some examples, video encoder 200 and video decoder 300 may be configured to constrain the dynamic range of filter coefficients for cross-component adaptive loop filters 332, 334 to reduce a cost multiplier. Let k be the number of bits used to represent the decimal part of a coefficient. The dynamic range of a filter coefficient may be constrained in the open interval $(-(1<<(k-c))+1, (1<<(k-c))-1)$. In some examples, a fixed dynamic range may be applied to all coefficients, i.e., c is fixed for all coefficients of cross-component adaptive loop filters 332, 334. In some examples, video encoder 200 and video decoder 300 may code c at the SPS, PPS, APS, or slice level, and video encoder 200 and video decoder 300 may apply the same value of c when coding all coefficients of cross-component adaptive loop filters 332, 334 in the same SPS, PPS, APS, or slice. In some examples, video encoder 200 and video decoder 300 may code c at a filter level (i.e., for each of cross-component adaptive loop filters 332, 334) and video encoder 200 and video decoder 300 may apply the same value of c for all coefficients of the corresponding one of cross-component adaptive loop filters 332, 334.

In some examples, video encoder 200 and video decoder 300 may code an enable flag at each chroma coding tree block (CTB). If the flag for a CTB is true, video encoder 200 and video decoder 300 may code the control mask for this CTB; if the flag of the CTB is false, video encoder 200 and video decoder 300 do not code the control mask for this CTB, and CCALF is not applied to this CTB.

In some examples, video encoder 200 and video decoder 300 may use multiple CCALF filters for chroma components within a slice. Video encoder 200 and video decoder 300 may code APS indices of all applied filters in a slice header for the slice. Video encoder 200 and video decoder 300 may code the APS indices of each chroma component separately. Alternatively, all chroma components may share the same set of APS indices. Then, in the slice, for each chroma CTB where a cross-component adaptive loop filter (CCALF) is applied, video encoder 200 and video decoder 300 may code an index for a filter from those APSs representing the actual CCALF to be used (e.g., the set of filter coefficients defining the corresponding CCALF).

In some examples, video encoder 200 and video decoder 300 may predict and code a filter of a CCALF in one APS from another filter of a CCALF in the same APS. Video encoder 200 and video decoder 300 may code a prediction flag to indicate whether prediction is applied or not.

In JVET-O636, filters of CCALF are signaled for each component separately, i.e., one chroma component can only use filters for the same component. According to the techniques of this disclosure, to remove this constraint such that a pixel of a chroma component may use any of CCALF filters in an APS, video encoder 200 and video decoder 300 may code the filter information (e.g., which filter/set of filter coefficients for cross-component adaptive loop filters 332, 334) at slice/CTB/sub-CTB level.

Figure 5:
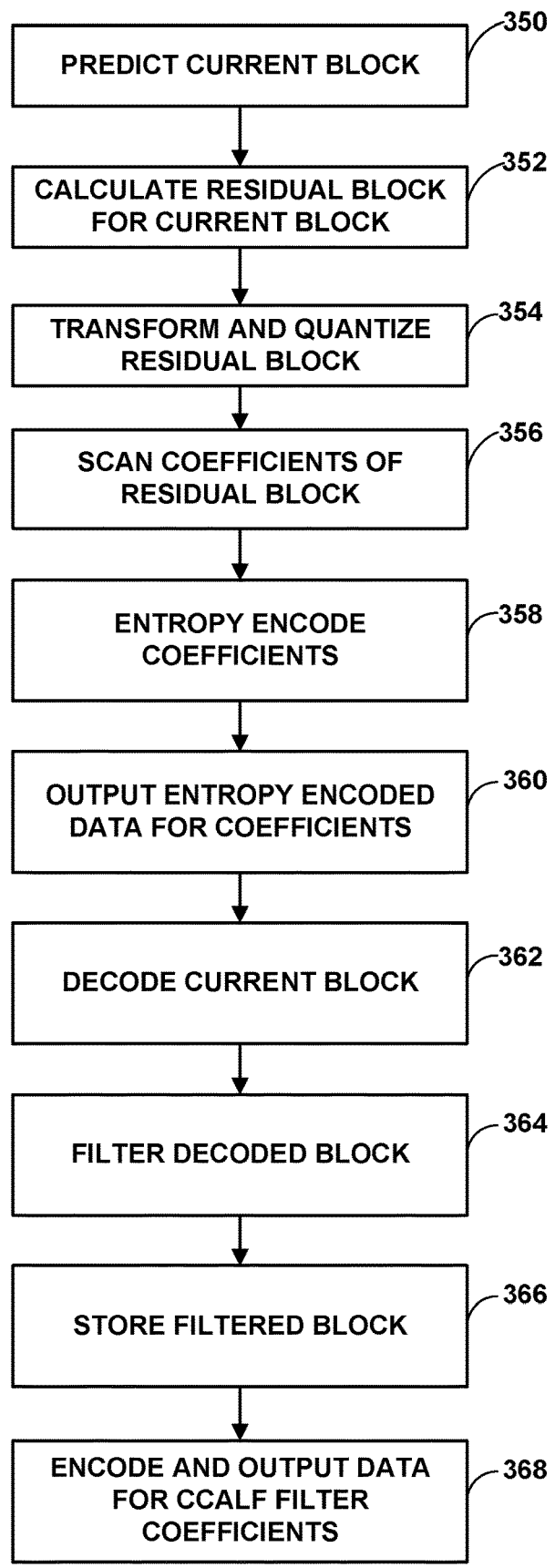
FIG. 5 is a flowchart illustrating an example method for encoding a current block in accordance with the techniques of this disclosure.

FIG. 5 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy encoded data of the block (360).

Video encoder 200 may then decode the current block (362). For example, video encoder 200 may inverse quantize and inverse transform the quantized transform coefficients to reproduce the residual block and combine the reproduced residual block with the prediction block. Video encoder 200 may then filter the decoded block (364), e.g., using cross-component adaptive loop filtering techniques according to this disclosure. The entropy encoded data of the block may further include, for example, filter indices indicating which cross-component adaptive loop filters are selected for the block. Video encoder 200 may then store the filtered block (366), e.g., for reference when predicting a future block to be encoded (and decoded).

Furthermore, video encoder 200 may encode and output data representing cross-component adaptive loop filter (CCALF) filter coefficients (368) according to the techniques of this disclosure, as discussed above and in greater detail below with respect to FIG. 7. For example, video encoder 200 may determine a dynamic range for a CCALF filter coefficient using a value of k (representing a number of bits used to represent a decimal portion of the CCALF filter coefficient) and a value of c (representing an offset to be applied to k), e.g., using the formula $(-(1<<(k-c))+1, (1<<(k-c))-1)$. In this example, "$-(1<<(k-c))+1$" represents a low end of the dynamic range, while "$1<<(k-c))-1$" represents a high end of the dynamic range.

In this manner, the method of FIG. 5 represents an example of a method of decoding (after encoding) video data, including determining a number of bits, k, used to represent a decimal value for a filter coefficient of a cross-component adaptive loop filter; determining that a dynamic range of the filter coefficient comprises $(-(1<<(k-c))+1, (1<<(k-c))-1)$ for a value of c, c representing an offset value to the value of k, and '<<' representing a bitwise left shift operator; decoding a block of video data; and performing cross-component adaptive loop filtering of the decoded block using the filter coefficient, the filter coefficient being within the dynamic range.

Figure 6:
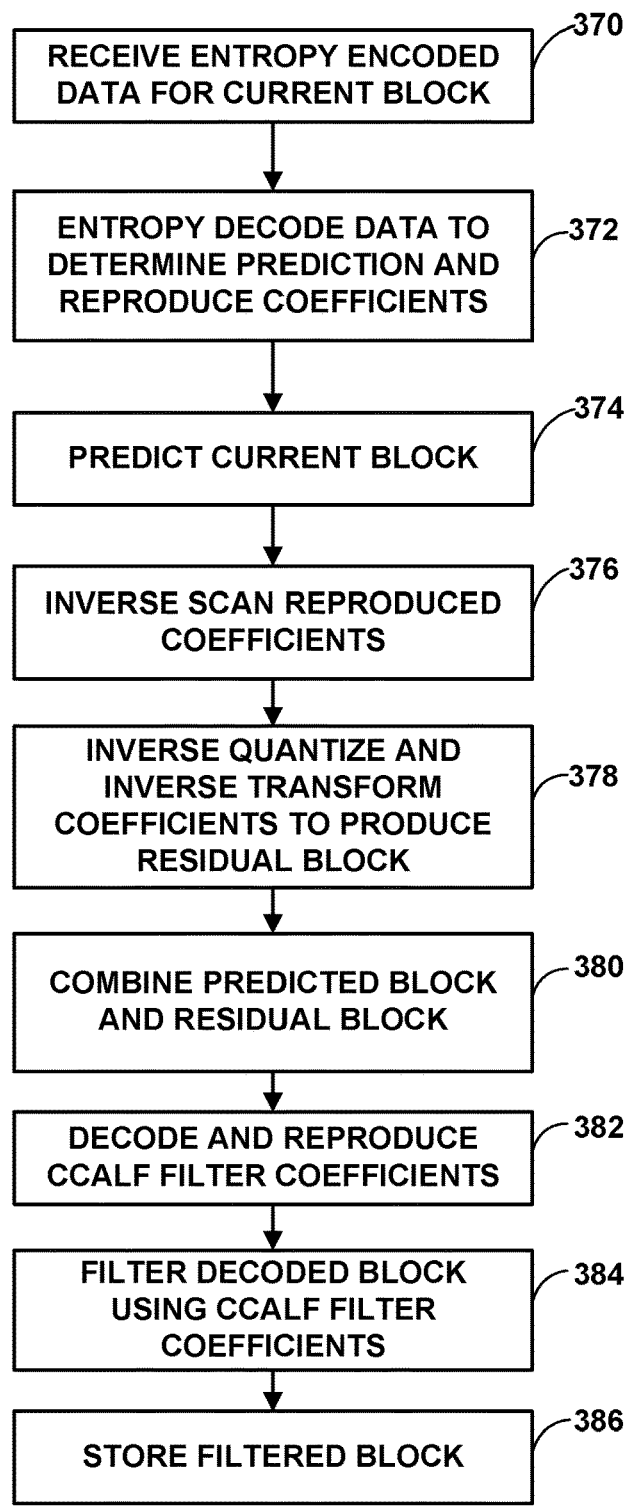
FIG. 6 is a flowchart illustrating an example method for decoding a current block in accordance with the techniques of this disclosure.

FIG. 6 is a flowchart illustrating an example method for decoding a current block in accordance with the techniques of this disclosure. The current block may comprise a current CU. Although described with respect to video decoder 300 (FIGS. 1 and 3), it should be understood that other devices may be configured to perform a method similar to that of FIG. 6.

Video decoder 300 may receive entropy encoded data for the current block, such as entropy encoded prediction information, entropy encoded data for coefficients of a residual block corresponding to the current block, and entropy encoded cross-component adaptive loop filter information for the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Moreover, video decoder 300 may decode and reproduce CCALF filter coefficients (382), e.g., as discussed above and explained in greater detail below with respect to FIG. 8. For example, video decoder 300 may determine a dynamic range for a CCALF filter coefficient using a value of k (representing a number of bits used to represent a decimal portion of the CCALF filter coefficient) and a value of c (representing an offset to be applied to k), e.g., using the formula $(-(1<<(k-c))+1, (1<<(k-c))-1)$. In this example, "$-(1<<(k-c))+1$" represents a low end of the dynamic range, while "$1<<(k-c))-1$" represents a high end of the dynamic range. Video decoder 300 may also filter the decoded block (384) using the CCALF filter coefficients, e.g., using cross-component adaptive loop filtering according to any of the techniques of this disclosure. Video decoder 300 may then store the filtered block (386), e.g., for reference when predicting a future block to be decoded.

In this manner, the method of FIG. 6 represents an example of a method of decoding video data, including determining a number of bits, k, used to represent a decimal value for a filter coefficient of a cross-component adaptive loop filter; determining that a dynamic range of the filter coefficient comprises (−(1<<(k−c))+1, (1<<(k−c))−1) for a value of c, c representing an offset value to the value of k, and '<<' representing a bitwise left shift operator; decoding a block of video data; and performing cross-component adaptive loop filtering of the decoded block using the filter coefficient, the filter coefficient being within the dynamic range.

Figure 7:
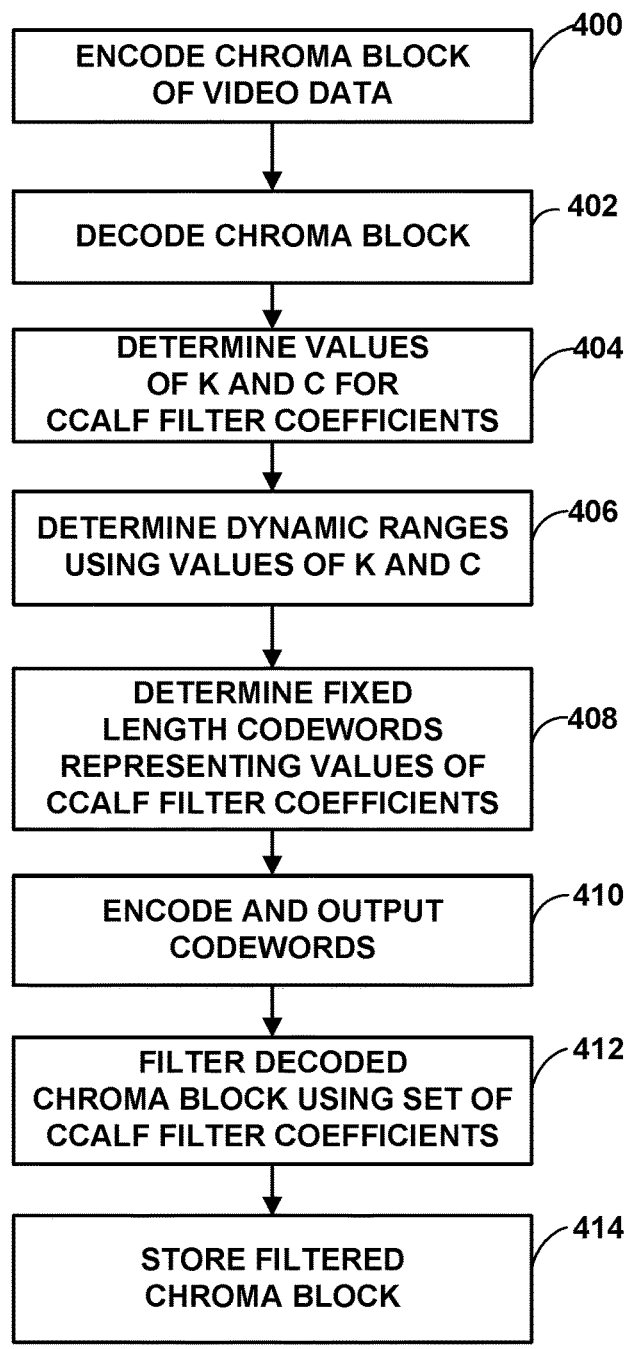
FIG. 7 is a flowchart illustrating an example method of encoding a block of video data according to the techniques of this disclosure.

FIG. 7 is a flowchart illustrating an example method of encoding a block of video data according to the techniques of this disclosure. The method of FIG. 7 is described with respect to video encoder 200 of FIGS. 1 and 2, although it should be understood that other devices may be configured to perform this or a similar method.

Video encoder 200 may initially encode a chrominance (chroma) block of video data (400). Video encoder 200 may generally perform the method of FIG. 5 discussed above to encode the chroma block, as also explained with respect to FIG. 2. Video encoder 200 may then decode the chroma block (402), again as discussed above with respect to FIG. 5 and FIG. 2. That is, as shown in FIG. 2, video encoder 200 also includes video decoding components, such as inverse quantization unit 210, inverse transform unit 212, and reproduction unit 214, which decode an encoded block.

Video encoder 200 may also determine values of k and c for CCALF filter coefficients (404). As explained above, video encoder 200 may determine the value of k for each CCALF filter coefficient as representing a number of bits used to represent a decimal portion of the CCALF filter coefficient value. The value of c represents an offset to be applied to the value of k, and may be fixed for all of the CCALF filter coefficients of a CCALF. The value of k may be less than 10 and greater than 0. In some examples, c may be pre-determined, while in other examples, video encoder 200 may encode the value of c, e.g., in a sequence parameter set (SPS), a picture parameter set (PPS), an adaptation parameter set (APS), a slice header, a block header, or at a filter level (e.g., along with other filter data in the APS). Likewise, video encoder 200 may dynamically determine the value of k and encode the value of k as part of the video bitstream.

Video encoder 200 may then determine dynamic ranges for the CCALF filter coefficients using the values of k and c (406). For example, video encoder 200 may determine the dynamic range of a given CCALF filter coefficient using the values of k and c for that CCALF filter coefficient using the formulas (−(1<<(k−c))+1, (1<<(k−c))−1), where "−(1<<(k−c))+1" represents a low end of the dynamic range, and "1 (k−c))−1" represents a high end of the dynamic range.

Furthermore, video encoder 200 may determine fixed length codewords representing the values of the CCALF filter coefficients (408). A fixed length codeword may represent a value of a CCALF filter coefficient as a difference between the CCALF filter coefficient and the low end of the dynamic range. Moreover, the fixed length codewords may be constructed so as not to include codewords representing CCALF filter coefficient values exceeding the high end of the dynamic range. Additionally, video encoder 200 may encode other data for the CCALFs, such as indices identifying one or more appropriate CCALFs in a slice header of a slice including the chroma block or a block header of the chroma block.

In other examples, rather than using fixed length codewords, video encoder 200 may entropy encode the CCALF filter coefficients using j-th order exponential Golomb codewords, where j may be the same for each of the filter coefficients. Video encoder 200 may further entropy encode the value of j, e.g., in an SPS, PPS, APS, slice header, block header, or at a filter level. Alternatively, the value of j may be pre-configured.

Moreover, in some examples, video encoder 200 may predict CCALF filter coefficients of a CCALF from CCALF filter coefficients of another CCALF. For example, video encoder 200 may predict CCALF filter coefficients of a red hue chroma block CCALF from CCALF filter coefficients of a blue hue chroma block, or vice versa. Additionally or alternatively, video encoder 200 may predict a first set of CCALF filter coefficients from a second set of CCALF filter coefficients, both for the same chroma component (e.g., both for a blue hue component or both for a red hue component). Video encoder 200 may encode a flag indicating whether the CCALF filter coefficients for a certain CCALF filter are predicted from another CCALF filter.

Video encoder 200 may further encode and output the codewords for the CCALF filter coefficients (410). In some examples, the codewords themselves may be fully encoded representations of the CCALF filter coefficients, while in other examples, the codewords may represent binarized values for the CCALF filter coefficients that video encoder 200 may further entropy encode, e.g., using CABAC. Video encoder 200 may then filter the decoded chroma block using the set of CCALF filter coefficients (412) and store the filtered chroma block (414).

In this manner, the method of FIG. 7 represents an example of a method of decoding (after encoding) video data, including determining a number of bits, k, used to represent a decimal value for a filter coefficient of a cross-component adaptive loop filter; determining that a dynamic range of the filter coefficient comprises (−(1<<(k−c))+1, (1<<(k−c))−1) for a value of c, c representing an offset value to the value of k, and '<<' representing a bitwise left shift operator; decoding a block of video data; and performing cross-component adaptive loop filtering of the decoded block using the filter coefficient, the filter coefficient being within the dynamic range.

Figure 8:
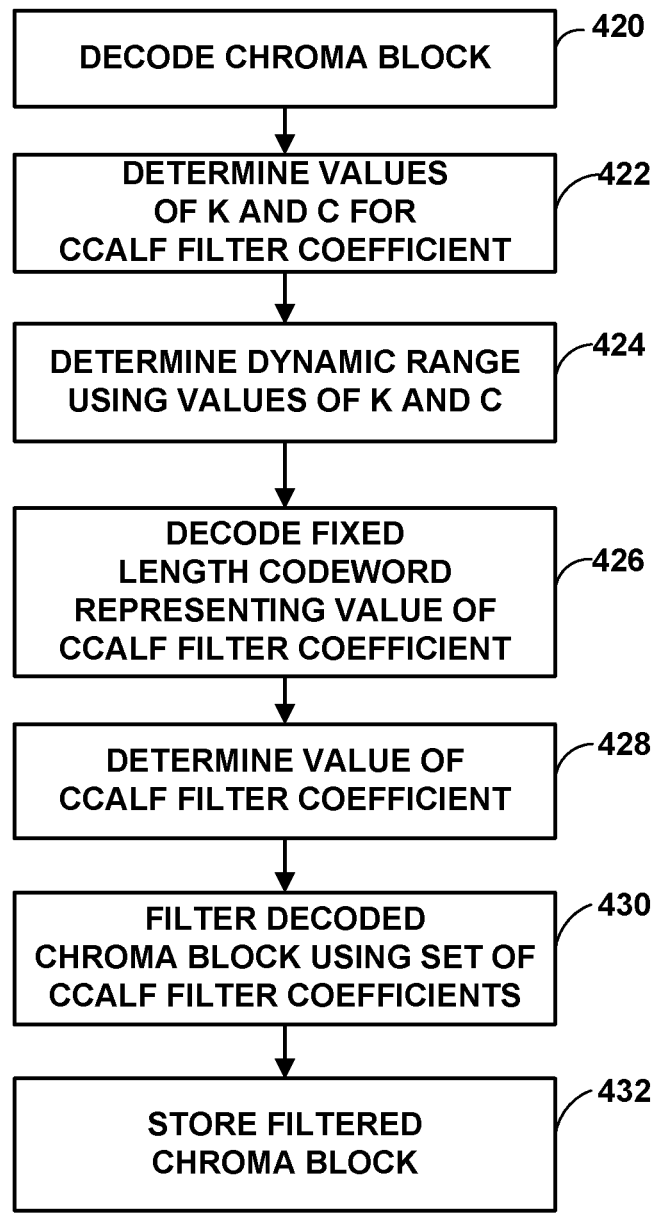
FIG. 8 is a flowchart illustrating an example method of encoding a block of video data according to the techniques of this disclosure.

FIG. 8 is a flowchart illustrating an example method of encoding a block of video data according to the techniques of this disclosure. The method of FIG. 8 is described with respect to video decoder 300 of FIGS. 1 and 3, although it should be understood that other devices may be configured to perform this or a similar method.

Video decoder 300 may initially decode a chroma block of video data (420). Video decoder 300 may generally perform the method of FIG. 6 discussed above to decode the chroma block, as also explained with respect to FIG. 3.

Video decoder 300 may also determine values of k and c for CCALF filter coefficients (422). As explained above, video decoder 300 may determine the value of k for each CCALF filter coefficient as representing a number of bits used to represent a decimal portion of the CCALF filter coefficient value. The value of c represents an offset to be applied to the value of k, and may be fixed for all of the CCALF filter coefficients of a CCALF. The value of k may be less than 10 and greater than 0. In some examples, c may be pre-determined, while in other examples, video decoder 300 may decode the value of c, e.g., in a sequence parameter set (SPS), a picture parameter set (PPS), an adaptation parameter set (APS), a slice header, a block header, or at a filter level (e.g., along with other filter data in the APS). Likewise, video decoder 300 may decode the value of k as part of the video bitstream.

Video decoder 300 may then determine dynamic ranges for the CCALF filter coefficients using the values of k and c (424). For example, video decoder 300 may determine the dynamic range of a given CCALF filter coefficient using the values of k and c for that CCALF filter coefficient using the formulas $(-(1<<(k-c))+1, (1<<(k-c))-1)$, where "$-(1<<(k-c))+1$" represents a low end of the dynamic range, and "$1(k-c))-1$" represents a high end of the dynamic range.

Furthermore, video decoder 300 may decode fixed length codewords representing the values of the CCALF filter coefficients (426). A fixed length codeword may represent a value of a CCALF filter coefficient as a difference between the CCALF filter coefficient and the low end of the dynamic range. Moreover, the fixed length codewords may be constructed so as not to include codewords representing CCALF filter coefficient values exceeding the high end of the dynamic range. Additionally, video decoder 300 may decode other data for the CCALFs, such as indices identifying one or more appropriate CCALFs in a slice header of a slice including the chroma block or a block header of the chroma block.

In other examples, rather than using fixed length codewords, video decoder 300 may entropy decode the CCALF filter coefficients using j-th order exponential Golomb codewords, where j may be the same for each of the filter coefficients. Video decoder 300 may further entropy decode the value of j, e.g., in an SPS, PPS, APS, slice header, block header, or at a filter level. Alternatively, the value of j may be pre-configured.

Moreover, in some examples, video decoder 300 may predict CCALF filter coefficients of a CCALF from CCALF filter coefficients of another CCALF. For example, video decoder 300 may predict CCALF filter coefficients of a red hue chroma block CCALF from CCALF filter coefficients of a blue hue chroma block, or vice versa. Additionally or alternatively, video decoder 300 may predict a first set of CCALF filter coefficients from a second set of CCALF filter coefficients, both for the same chroma component (e.g., both for a blue hue component or both for a red hue component). Video decoder 300 may decode a flag indicating whether the CCALF filter coefficients for a certain CCALF filter are predicted from another CCALF filter.

Video decoder 300 may then filter the decoded chroma block using the set of CCALF filter coefficients (430) and store the filtered chroma block (432).

In this manner, the method of FIG. 8 represents an example of a method of decoding video data, including determining a number of bits, k, used to represent a decimal value for a filter coefficient of a cross-component adaptive loop filter; determining that a dynamic range of the filter coefficient comprises $(-(1<<(k-c))+1, (1<<(k-c))-1)$ for a value of c, c representing an offset value to the value of k, and '<<' representing a bitwise left shift operator; decoding a block of video data; and performing cross-component adaptive loop filtering of the decoded block using the filter coefficient, the filter coefficient being within the dynamic range.

Certain techniques of this disclosure are summarized in the following examples.

Example 1: A method of decoding video data, the method comprising: coding a filter coefficient of a cross-component adaptive loop filter using a fixed length codeword; decoding a block of video data; and performing cross-component adaptive loop filtering of the decoded block using the filter coefficient.

Example 2: A method of decoding video data, the method comprising: coding all filter coefficients of a cross-component adaptive loop filter using respective k-th order exponential Golomb codewords, wherein k is the same for each of the filter coefficients; decoding a block of video data; and performing cross-component adaptive loop filtering of the decoded block using the filter coefficients.

Example 3: The method of example 2, wherein a value for k is pre-configured.

Example 4: The method of example 2, further comprising coding a value for k.

Example 5: The method of example 4, wherein coding the value for k comprises coding the value for k in at least one of a sequence parameter set (SPS), a picture parameter set (PPS), an adaptation parameter set (APS), a slice header, a block header, or at a filter level.

Example 6: A method of decoding video data, the method comprising: coding a filter coefficient of a cross-component adaptive loop filter using a number of bits less than 10 and greater than 0 to represent a decimal value for the filter coefficient; decoding a block of video data; and performing cross-component adaptive loop filtering of the decoded block using the filter coefficient.

Example 7: A method comprising a combination of the method of any of examples 1-5 and the method of example 6.

Example 8: A method of decoding video data, the method comprising: determining a number of bits, k, used to represent a decimal value for a filter coefficient of a cross-component adaptive loop filter; determining that a dynamic range of the filter coefficient comprises $(-(1<<(k-c))+1, (1<<(k-c))-1)$ for a value of c; decoding a block of video data; and performing cross-component adaptive loop filtering of the decoded block using the filter coefficient.

Example 9: The method of example 8, wherein the value of c is fixed for all filter coefficients of the cross-component adaptive loop filter.

Example 10: The method of any of examples 8 and 9, further comprising coding the value of c in at least one of a sequence parameter set (SPS), a picture parameter set (PPS), an adaptation parameter set (APS), a slice header, a block header, or at a filter level.

Example 11: A method comprising a combination of the method of any of examples 1-7 and the method of any of examples 8-10.

Example 12: A method of decoding video data, the method comprising: coding a value for cross-component adaptive loop filter enable flag for a coding tree block (CTB) of video data, the value indicating whether or not cross-component adaptive loop filtering is enabled for the CTB; decoding the CTB; and performing cross-component adaptive loop filtering of the decoded CTB only when the value indicates that cross-component adaptive loop filtering is enabled for the CTB.

Example 13: A method comprising a combination of the method of any of examples 1-11 and the method of example 12.

Example 14: A method of decoding video data, the method comprising: coding a plurality of sets of filter coefficients for a plurality of cross-component adaptive loop filters in an adaptation parameter set (APS); coding one or more indices referencing one or more of the plurality of sets of filter coefficients in a slice header for a slice of video data; decoding a block of the slice; and performing cross-component adaptive loop filtering of the decoded block using the one or more of the plurality of sets of filter coefficients referenced by the one or more indices.

Example 15: A method of decoding video data, the method comprising: coding a plurality of sets of filter coefficients for a plurality of cross-component adaptive loop filters in an adaptation parameter set (APS); coding one or more indices referencing one or more of the plurality of sets of filter coefficients in a coding tree block (CTB) of video data; decoding the CTB; and performing cross-component adaptive loop filtering of the decoded CTB using the one or more of the plurality of sets of filter coefficients referenced by the one of more indices.

Example 16: A method comprising a combination of the method of any of examples 1-13 and the method of any of examples 14 or 15.

Example 17: A method of decoding video data, the method comprising: coding a first set of filter coefficients for a first cross-component adaptive loop filter; coding a second set of filter coefficients for a second cross-component adaptive loop filter, wherein coding the second set of filter coefficients comprises predicting one or more of the second set of filter coefficients from the first set of one or more filter coefficients; decoding a block of video data; and performing cross-component adaptive loop filtering of the decoded block using the second set of filter coefficients.

Example 18: The method of example 17, further comprising coding a value for a prediction flag indicating that the one or more of the second set of filter coefficients are predicted from the first set of filter coefficients.

Example 19: A method comprising a combination of the method of any of examples 1-16 and the method of any of examples 17 or 18.

Example 20: A method of decoding video data, the method comprising: coding a set of filter coefficients for a cross-component adaptive loop filter; decoding a first block of a first chroma component and a second block of a second chroma component, the first chroma component being different than the second chroma component; performing cross-component adaptive loop filtering of the first decoded block using the set of filter coefficients; and performing cross-component adaptive loop filtering of the second decoded block using the set of filter coefficients.

Example 21: The method of example 20, wherein the first chroma component comprises a blue hue chroma component and the second chroma component comprises a red hue chroma component.

Example 22: The method of any of examples 20 and 21, further comprising: coding a filter index identifying the set of filter coefficients for the first decoded block; and coding the filter index identifying the set of filter coefficients for the second decoded block.

Example 23: The method of example 22, wherein coding the filter index comprises coding the filter index in a slice header, a coding tree block (CTB) header, or a sub-CTB level.

Example 24: A method comprising a combination of the method of any of examples 1-19 and the method of any of examples 20-23.

Example 25: The method of any of examples 1-24, further comprising encoding the block or CTB prior to decoding the block or CTB.

Example 26: A device for encoding or decoding video data, the device comprising one or more means for performing the method of any of examples 1-25.

Example 27: The device of example 26, further comprising a display configured to display decoded video data.

Example 28: The device of example 26, wherein the device comprises one or more of a camera, a computer, a mobile device, a broadcast receiver device, or a set-top box.

Example 29: The device of example 26, further comprising a memory configured to store the video data.

Example 30: The device of example 26, further comprising a camera configured to capture the video data.

Example 31: The device of example 26, wherein the device comprises at least one of: an integrated circuit; a microprocessor; or a wireless communication device.

Example 32: A computer-readable storage medium having stored thereon instructions that, when executed, cause a processor to perform the method of any of examples 1-25.

Example 33: A device for decoding video data, the device comprising: means for coding a filter coefficient of a cross-component adaptive loop filter using a fixed length codeword; means for decoding a block of video data; and means for performing cross-component adaptive loop filtering of the decoded block using the filter coefficient.

Example 34: A device for decoding video data, the device comprising: means for coding all filter coefficients of a cross-component adaptive loop filter using respective k-th order exponential Golomb codewords, wherein k is the same for each of the filter coefficients; means for decoding a block of video data; and means for performing cross-component adaptive loop filtering of the decoded block using the filter coefficients.

Example 35: A device for decoding video data, the device comprising: means for coding a filter coefficient of a cross-component adaptive loop filter using a number of bits less than 10 and greater than 0 to represent a decimal value for the filter coefficient; means for decoding a block of video data; and means for performing cross-component adaptive loop filtering of the decoded block using the filter coefficient.

Example 36: A device for decoding video data, the device comprising: means for determining a number of bits, k, used to represent a decimal value for a filter coefficient of a cross-component adaptive loop filter; means for determining that a dynamic range of the filter coefficient comprises $(-(1<<(k-c))+1, (1<<(k-c))-1)$ for a value of c; means for decoding a block of video data; and means for performing cross-component adaptive loop filtering of the decoded block using the filter coefficient.

Example 37: A device for decoding video data, the device comprising: means for coding a value for cross-component adaptive loop filter enable flag for a coding tree block (CTB) of video data, the value indicating whether or not cross-component adaptive loop filtering is enabled for the CTB; means for decoding the CTB; and means for performing cross-component adaptive loop filtering of the decoded CTB only when the value indicates that cross-component adaptive loop filtering is enabled for the CTB.

Example 38: A device for decoding video data, the device comprising: means for coding a plurality of sets of filter coefficients for a plurality of cross-component adaptive loop filters in an adaptation parameter set (APS); means for coding one or more indices referencing one or more of the plurality of sets of filter coefficients in a slice header for a slice of video data; means for decoding a block of the slice; and means for performing cross-component adaptive loop filtering of the decoded block using the one or more of the plurality of sets of filter coefficients.

Example 39: A device for decoding video data, the device comprising: means for coding a plurality of sets of filter coefficients for a plurality of cross-component adaptive loop filters in an adaptation parameter set (APS); means for coding one or more indices referencing one or more of the plurality of sets of filter coefficients in a coding tree block (CTB) of video data; means for decoding the CTB; and means for performing cross-component adaptive loop filtering of the decoded CTB using the one or more of the plurality of sets of filter coefficients.

Example 40: A device for decoding video data, the device comprising: means for coding a first set of filter coefficients for a first cross-component adaptive loop filter; means for coding a second set of filter coefficients for a second cross-component adaptive loop filter, wherein coding the second set of filter coefficients comprises predicting one or more of the second set of filter coefficients from the first set of one or more filter coefficients; means for decoding a block of video data; and means for performing cross-component adaptive loop filtering of the decoded block using the second set of filter coefficients.

Example 41: A device for decoding video data, the device comprising: means for coding a set of filter coefficients for a cross-component adaptive loop filter; means for decoding a first block of a first chroma component and a second block of a second chroma component, the first chroma component being different than the second chroma component; means for performing cross-component adaptive loop filtering of the first decoded block using the set of filter coefficients; and means for performing cross-component adaptive loop filtering of the second decoded block using set of filter coefficients.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a filter coefficient of a cross-component adaptive loop filter, the filter coefficient having a dynamic range between a first value and a second value corresponding to $(-(1<<(k-c))+1, (1<<(k-c))-1)$ for a value of k, k being a number of bits used to represent a decimal value for the filter coefficient, a value of c, c representing an offset value to the value of k, and '<<' representing a bitwise left shift operator;
   decoding a block of video data; and
   performing cross-component adaptive loop filtering of the decoded block using the filter coefficient, the filter coefficient being within the dynamic range.

2. The method of claim 1, wherein the value of c is fixed for all filter coefficients of the cross-component adaptive loop filter.

3. The method of claim 1, further comprising decoding the value of c in at least one of a sequence parameter set (SPS), a picture parameter set (PPS), an adaptation parameter set (APS), a slice header, a block header, or at a filter level.

4. The method of claim 1, further comprising decoding a fixed length codeword representing the filter coefficient.

5. The method of claim 1, further comprising decoding all coefficients of the cross-component adaptive loop filter using respective j-th order exponential Golomb codewords, wherein j is the same for each of the filter coefficients.

6. The method of claim 5, wherein a value for j is pre-configured.

7. The method of claim 5, further comprising decoding a value for j.

8. The method of claim 7, wherein decoding the value for j comprises decoding the value for j in at least one of a sequence parameter set (SPS), a picture parameter set (PPS), an adaptation parameter set (APS), a slice header, a block header, or at a filter level.

9. The method of claim 1, wherein the value of k is less than 10 and greater than 0.

10. The method of claim 1, wherein the block comprises a coding tree block (CTB), the method further comprising decoding a value for a cross-component adaptive loop filter enable flag for the CTB, the value indicating that cross-component adaptive loop filtering is enabled for the CTB.

11. The method of claim 1, further comprising:
decoding a plurality of sets of filter coefficients for a plurality of cross-component adaptive loop filters in an adaptation parameter set (APS) for a slice including the current block; and
decoding one or more indices referencing one or more of the plurality of sets of filter coefficients in a slice header for the slice, the one or more of the plurality of sets of filter coefficients including the filter coefficient.

12. The method of claim 1, further comprising:
decoding a plurality of sets of filter coefficients for a plurality of cross-component adaptive loop filters in an adaptation parameter set (APS) for a slice including the current block; and
decoding one or more indices referencing one or more of the plurality of sets of filter coefficients in a block header of the current block, the one or more of the plurality of sets of filter coefficients including the filter coefficient.

13. The method of claim 1, wherein the cross-component adaptive loop filter comprises a second cross-component adaptive loop filter, the method further comprising:
decoding a first set of filter coefficients for a first cross-component adaptive loop filter;
decoding a second set of filter coefficients, including the filter coefficient, for the second cross-component adaptive loop filter, wherein decoding the second set of filter coefficients comprises predicting one or more of the second set of filter coefficients from the first set of one or more filter coefficients.

14. The method of claim 13, further comprising coding a value for a prediction flag indicating that the one or more of the second set of filter coefficients are predicted from the first set of filter coefficients.

15. The method of claim 1, wherein the block comprises a first block of a first chroma component, the method further comprising:
decoding a second block of a second chroma component, the first chroma component being different than the second chroma component; and
performing cross-component adaptive loop filtering of the second decoded block using filter coefficient.

16. The method of claim 15, wherein the first chroma component comprises a blue hue chroma component and the second chroma component comprises a red hue chroma component.

17. The method of claim 1, further comprising encoding the block prior to decoding the block.

18. A device for decoding video data, the device comprising:
a memory configured to store video data; and
one or more processors implemented in circuitry and configured to:
determine a filter coefficient of a cross-component adaptive loop filter, the filter coefficient having a dynamic range between a first value and a second value corresponding to $(-(1<<(k-c))+1, (1<<(k-c))-1)$ for a value of k, k being a number of bits used to represent a decimal value for the filter coefficient, a value of c, c representing an offset value to the value of k, and '$<<$' representing a bitwise left shift operator;
decode a block of the video data; and
perform cross-component adaptive loop filtering of the decoded block using the filter coefficient, the filter coefficient being within the dynamic range.

19. The device of claim 18, wherein the one or more processors are further configured to decode a fixed length codeword representing the filter coefficient.

20. The device of claim 18, wherein the value of k is less than 10 and greater than 0.

21. The device of claim 18, wherein the one or more processors are further configured to:
decode a plurality of sets of filter coefficients for a plurality of cross-component adaptive loop filters in an adaptation parameter set (APS) for a slice including the current block; and
decode one or more indices referencing one or more of the plurality of sets of filter coefficients in a slice header for the slice, the one or more of the plurality of sets of filter coefficients including the filter coefficient.

22. The device of claim 18, wherein the one or more processors are further configured to encode the block prior to decoding the block.

23. The device of claim 18, further comprising a display configured to display decoded video data.

24. The device of claim 18, wherein the device comprises one or more of a camera, a computer, a mobile device, a broadcast receiver device, or a set-top box.

25. The device of claim 18, further comprising a camera configured to capture the video data.

26. The device of claim 18, wherein the device comprises at least one of:
an integrated circuit;
a microprocessor; or
a wireless communication device.

27. A non-transitory computer-readable storage medium having stored thereon instructions that, when executed, cause a processor to:
determine a filter coefficient of a cross-component adaptive loop filter, the filter coefficient having a dynamic range between a first value and a second value corresponding to $(-(1<<(k-c))+1, (1<<(k-c))-1)$ for a value of k, k being a number of bits used to represent a decimal value for the filter coefficient, a value of c, c representing an offset value to the value of k, and '$<<$' representing a bitwise left shift operator;
decode a block of video data; and
performing cross-component adaptive loop filtering of the decoded block using the filter coefficient, the filter coefficient being within the dynamic range.

* * * * *